United States Patent
Larson et al.

(10) Patent No.: US 7,237,084 B2
(45) Date of Patent: Jun. 26, 2007

(54) METHOD AND PROGRAM PRODUCT FOR AVOIDING CACHE CONGESTION BY OFFSETTING ADDRESSES WHILE ALLOCATING MEMORY

(75) Inventors: Douglas Vincent Larson, Santa Clara, CA (US); Richard Glen Fowles, Meadow Vista, CA (US); Blaine Douglas Gaither, Fort Collins, CO (US); Benjamin Daniel Osecky, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 221 days.

(21) Appl. No.: 10/694,302

(22) Filed: Oct. 27, 2003

(65) Prior Publication Data

US 2005/0091466 A1    Apr. 28, 2005

(51) Int. Cl.
*G06F 12/06* (2006.01)
(52) U.S. Cl. ..................................... 711/171
(58) Field of Classification Search ............... 711/171, 711/170
See application file for complete search history.

(56) References Cited

U.S. PATENT DOCUMENTS 5,675,790 A * 10/1997 Walls ......................... 711/171
5,930,827 A * 7/1999 Sturges ....................... 711/170
6,804,761 B1 * 10/2004 Chen et al. .................. 711/170
6,957,294 B1 * 10/2005 Saunders et al. .............. 711/4

OTHER PUBLICATIONS

Chavarria-Miranda, Daniel and John Mellor-Crummey, "An Evaluation of Data-Parallel Compiler Support for Line-Sweep Applications". Apr. 2003, Journal of Instruction-Level Parallelism 5, pp. 17-28.*
Cray T3ETM Fortran Optimization Guide—004-2518-002, "Chapter 4. Single-PE Optimization—Section 4.3: Optimization for Cache", Jan. 1999, Sections 4.3.0-4.3.3.*
Chavarria-Miranda, Daniel and John Mellor-Crummey, "An Evaluation of Data-Parallel Compiler Support for Line-Sweep Applications". Apr. 2003, Journal of Instruction-Level Parallelism 5, pp. 1-29.*

* cited by examiner

*Primary Examiner*—Pierre-Michel Bataille

(57) ABSTRACT

A method of allocating memory operates to avoid overlapping hot spots in cache that can ordinarily cause cache thrashing. This method includes steps of determining a spacer size, reserving a spacer block of memory from a memory pool, and allocating memory at a location following the spacer block. In an alternative embodiment, the spacer size is determined randomly in a range of allowable spacer size. In other alternative embodiments, spacers are allocated based upon size of a previously allocated memory block.

3 Claims, 2 Drawing Sheets

METHOD AND PROGRAM PRODUCT FOR AVOIDING CACHE CONGESTION BY OFFSETTING ADDRESSES WHILE ALLOCATING MEMORY

FIELD OF THE DISCLOSURE

The disclosure relates to the field of dynamic memory allocation in cache-based computer systems. In particular, the disclosure relates to a method and apparatus for offsetting starting addresses of blocks of dynamically allocated memory to avoid alignment of hot spots at similar cache addresses.

BACKGROUND

Many computer systems available today have cache memory.

Cache memories are high speed memory systems that store a partial copy of the contents of a larger, slower, memory system. In addition to storage, known herein as cache data memory, cache memory systems also have mapping apparatus for identifying those portions of the larger, slower, memory system held in cache, and mapping those portions into corresponding locations in the cache. This mapping apparatus often takes the form of a cache tag memory.

Many modern computer systems implement a hierarchy of cache memory systems. Many common processors, including Intel Pentium-II and Pentium-III circuits, have two levels of cache. Systems have been built implementing three, or even four, levels of cache memory. For purposes of this document, a low level of cache is relatively closer in hierarchy to the processor than a high level of cache, and a high level of cache is relatively closer in the hierarchy to main memory.

Cache memories typically have separate cache tag memories for each level of cache. In a three level cache memory, there are typically separate tag memories for each level of the cache.

These cache systems have cache tag memory subsystems and cache data memory subsystems. Each cache data memory typically operates on units of data of a predetermined size, known as a cache line. The size of a cache line is often different for each level in a multilevel cache system; typically being larger for higher levels of cache. Typically, the size of the cache data memory is also larger for higher levels of cache.

In typical cache memory systems, when a memory location at a particular main-memory address is to be read, a cache-line set address is derived from part of the main-memory address. The cache-line set address is typically presented to the cache tag memory and to the cache data memory; and a read operation done on both memories.

Cache tag memory typically contains one or more address tag fields. Each address tag field is compared to part or all of a main memory address to determine whether any part of data read from the cache data memory corresponds to data at the desired main-memory address. If the tag indicates that the desired data is in the cache data memory, that data is presented to the processor and next lower-level cache; if not, then the read operation is passed up to the next higher-level cache. If there is no higher-level cache, the read operation is passed to main memory.

Many caches are of the "set associative" type. In set associative caches, a "set" is a group of cache lines within a cache that share the same "set address", the portion of cache line address presented to both the cache data memory and the cache tag memory. Each cache line within the set typically has a separate address tag associated with it. In addition to a set address, locating data in cache typically also requires a word-in-cache-line address. N-way, set-associative, caches have N cache lines located at the same set address, and typically perform N comparisons of address tag fields to portions of the desired data address simultaneously. Each cache line has an associated way number.

Typically, a tag memory contains status information as well as data information. This status information may include "dirty" flags that indicate whether information in the cache has been written to but not yet updated in higher-level memory, and "valid" flags indicating that information in the cache is a valid copy of information in higher levels of the memory system.

A cache "hit" occurs whenever a memory access to the cache occurs and the cache system finds, through inspecting its tag memory, that the requested data is present and valid in the cache. A cache "miss" occurs whenever a memory access to the cache occurs and the cache system finds, through inspecting its tag memory, that the requested data is not present and valid in the cache.

When a cache "miss" occurs in a low level cache of a typical multilevel cache system, the main-memory address is typically passed up to the next level of cache, where it is checked in the higher-level cache tag memory in order to determine if there is a "hit" or a "miss" at that higher level. When a cache "miss" occurs at the highest level of cache, a memory reference is performed in main memory.

Since access times generally are greater at higher levels of a multilevel memory system, it is desirable that the "hit rate," the ratio of cache "hits" to cache "misses," be high in a system.

A cache "eviction" occurs whenever data in a cache is discarded to make room for data newly fetched from higher level cache or main memory. Since the discarded, or evicted, data is no longer in the cache, future references to the evicted data will result in a cache miss. Computer systems having frequent cache misses to recently evicted data, causing a low hit rate, are described as thrashing the cache.

Since a cache memory is smaller than higher level cache or main memory, multiple portions of higher level will map to each cache line location. When many of these multiple locations are frequently accessed, cache thrashing may occur at that cache line location.

Cache thrashing can be controlled by designing cache system hardware with a high number of ways of associativity. When the number of ways is greater than the number of frequently accessed locations of memory mapping to each cache line location, cache thrashing is less likely than when the number of ways is lower. Increasing the number of ways is expensive, since separate tag comparators are required for each way, and requires redesign of the memory system hardware.

A simple but common cache design derives cache line set addresses of length M bits from memory addresses of length L bits by extracting a group of M address bits from the memory address. Caches of this type, herein known as direct-mapped caches, have advantage in that fewer bits of address tag are required than with certain other cache architectures. It has been observed that large, page-aligned, dynamically allocated memory blocks have a significant likelihood of having hot spots that map to the same locations in cache systems of this type. The larger the page or block size, the more likely hot spots in each block are to map to the same addresses and induce cache thrashing.

Hot spots in each block are most likely to map to the same set address and cause thrashing when block sizes are large, and are particularly likely to map to the same set address when block sizes are a multiple of the cache size divided by the number of ways of associativity. Cache thrashing may result at the hot sets in the cache where hot spots in multiple blocks are mapped.

It is known that the likelihood of cache thrashing in systems of this type can be reduced by modifying hardware such that cache line addresses are derived, through a more complex algorithm, from a greater number of bits of the memory address. For example, a group of M high-order memory address bits may be XOR-ed with a group of M lower-order bits to generate an M-bit set address. Again, avoidance of cache thrashing in this way requires redesign of the memory system hardware.

Memory is dynamically allocated by a dynamic memory management module incorporated into many operating systems, such as Microsoft Windows, Linux, and Unix. System and application programs running on these systems typically may request that a block of a requested size be allocated for their use, the operating system allocates the block and returns a starting address of the allocated block to the requesting program. Application software, such as database software, may also incorporate a dynamic memory management module. Some application programs may superimpose their own dynamic memory allocation schemes upon an operating system dynamic memory allocation system.

Many systems also provide for garbage collection. Garbage collection is a mechanism for consolidating unused memory space, such as previously allocated memory blocks that have been released, into larger blocks. These larger memory blocks can then be allocated when large blocks are requested by system and application programs. Garbage collection may involve relocating used memory blocks within memory such that unused memory space between can be consolidated for reuse.

Dynamically allocated memory associated with a process often may include more than one block of more than one type. A process may, for example, be allocated a stack frame as well as one or more data blocks. Dynamically allocated memory is often accessed through a translation lookaside buffer (TLB).

Many computer systems have dynamic memory allocation software that allocates memory blocks such that blocks start at locations that are aligned to pages, that is each memory block begins at a location that is an even multiple of a page size. The page size is typically an even power of two.

Some programs are known that request dynamically allocated memory in large block sizes; Oracle database software is known to allocate memory in block sizes as large as four megabytes.

A "hot spot" in a memory block is a set of memory locations in the block that are frequently accessed. Should multiple hot spots in multiple memory blocks map to the same cache location, cache thrashing can occur. Hot spots in memory blocks may result in many ways, for example a database program may store index information at the start of each block, where the index information is accessed more frequently than individual data records at other locations within the block. The frequently accessed index information may produce a hot spot in the memory block.

Redesign of memory system hardware is expensive, time consuming, and can be accomplished only by hardware manufacturers. It is desirable to prevent cache thrashing in a way that can be implemented on existing hardware.

SUMMARY

A method of allocating blocks in memory of a computer system having a direct-mapped cache inserts spacers between blocks, such that addresses at the same relative addresses within each block do not map to the same set addresses in cache.

In an embodiment, spacers are inserted into large, newly allocated, stack frames as well as large data blocks.

In an alternative embodiment, the spacers are of random size and are inserted ahead of memory blocks whenever the preceding memory block is a large memory block. In another embodiment, the spacers are of size determined from a blocks allocated count. In another alternative embodiment, the spacers are located within allocated memory blocks and are implemented by avoiding use of a randomized number of cache lines of memory at the head end of the block.

In an alternative embodiment, garbage collection of spacers is inhibited until the associated memory block is released.

DETAILED DESCRIPTION OF THE EMBODIMENTS

Figure 1:
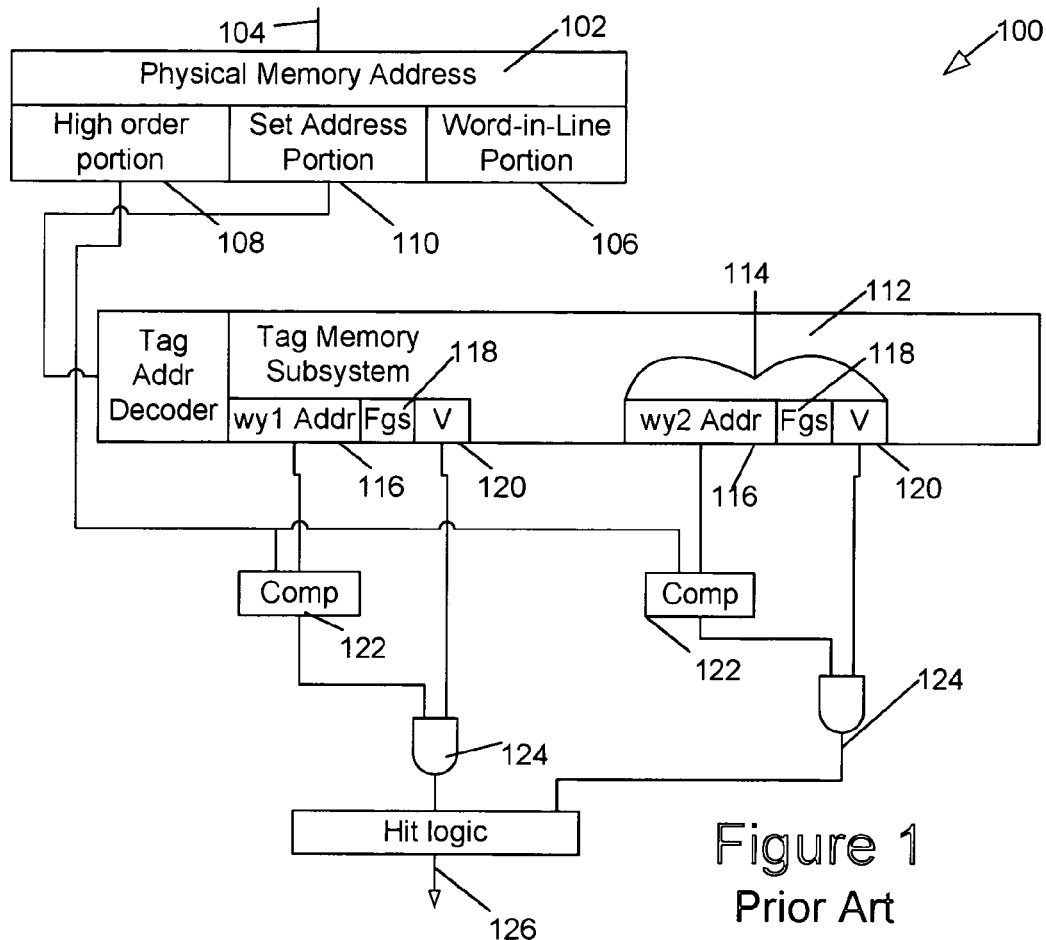
FIG. 1 is an exemplary block diagram of a portion of a cache controller, illustrating how cache line addresses are generated and how tag memory is used to locate data in the cache.

FIG. 1 illustrates key portions of a common type of set-associative cache controller 100. During program execution, physical memory addresses 102 enter this cache controller 100 through a processor port 104 from a translation lookaside buffer (not shown) associated with a processor. The physical memory address 102 is broken into three fields, a word-in-line portion 106, a high order portion 108, and a set address portion 110. The set address portion 110 is used as a set address, and to index a tag memory 112. Tag memory 112 has several cache way tags 114 at each set address, where each cache way tag 114 has a way address field 116, and way flags 118. Way flags field 118 includes a valid bit 120.

Comparators 122 compare way address fields 116 to the high order portion 108 of the physical memory address. Comparator match results are AND'ed 124 with valid bits 120 and other flags to determine cache hits 126, and to determine which way of the selected set has the requested data.

Figure 5:
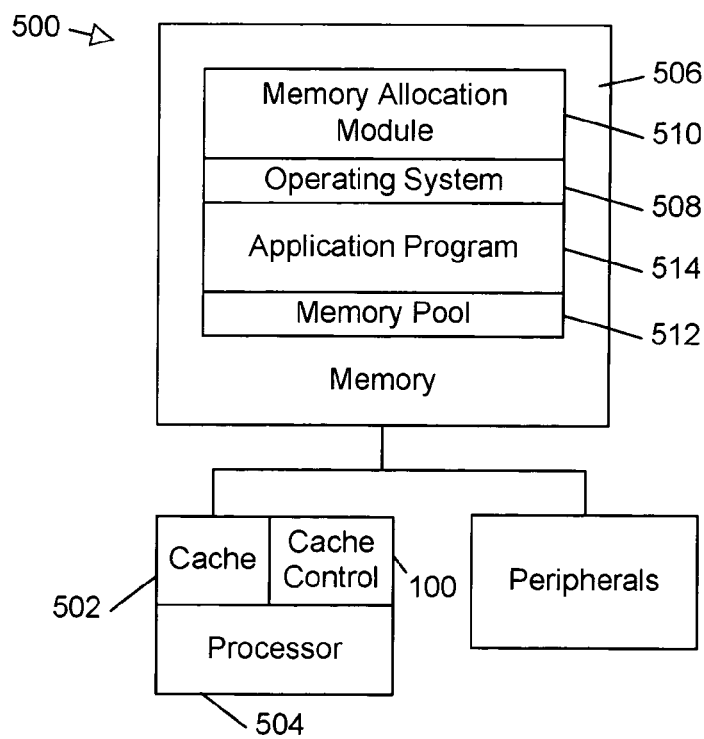
FIG. 5 is an exemplary block diagram of a computer system having a memory system and a cache memory system.

In the computer system illustrated in FIG. 5, the cache controller 100 determines when memory references from processor 504 score hits in cache 502. Memory read accesses that hit in cache 502 are satisfied with data read from cache 502, while those that miss are satisfied with data read from main memory 506. Main memory 506 also contains portions of an operating system 508, including a memory allocation module 510 for allocating portions, or blocks, of memory from a dynamically allocated memory pool 512 to application programs 514 and operating system routines.

Figure 2:
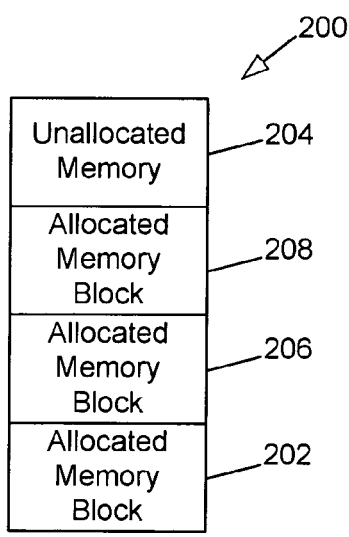
FIG. 2 is an illustration of blocks in main memory, allocated to prior-art allocation schemes.

FIG. 2 illustrates how a typical prior-art memory allocation module allocates memory. Each time a memory block from memory pool 200 is requested, an available block of memory of appropriate size, such as block 202, is returned. When no available block of appropriate size is available, but sufficient space exists in the unallocated memory 204 part of the memory pool 200, a block is allocated and returned. Should several large memory blocks be requested in sequence, the allocated blocks, such as block 206 and 208, tend to be located adjacent to each other in memory.

Should memory be allocated in consecutive large blocks, there is a possibility that hot spots in those blocks can map to the same sets in cache. For example, if large blocks having similar hot spots are allocated that are of size a power of two, where large is large with respect to the number of available cache lines times the cache line size, tend to cause the hot spots to map to the same sets in cache. Multiple hot spots mapped to the same locations in cache can cause cache thrashing.

Figure 3:
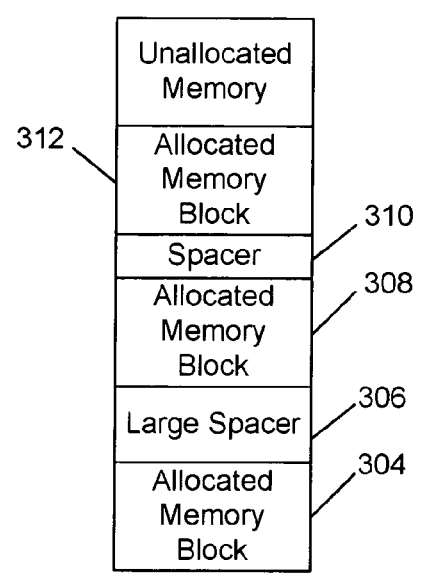
FIG. 3 is an illustration of blocks in main memory, allocated with spacers to avoid mapping of hot spots in multiple blocks to the same locations in cache.
Figure 4:
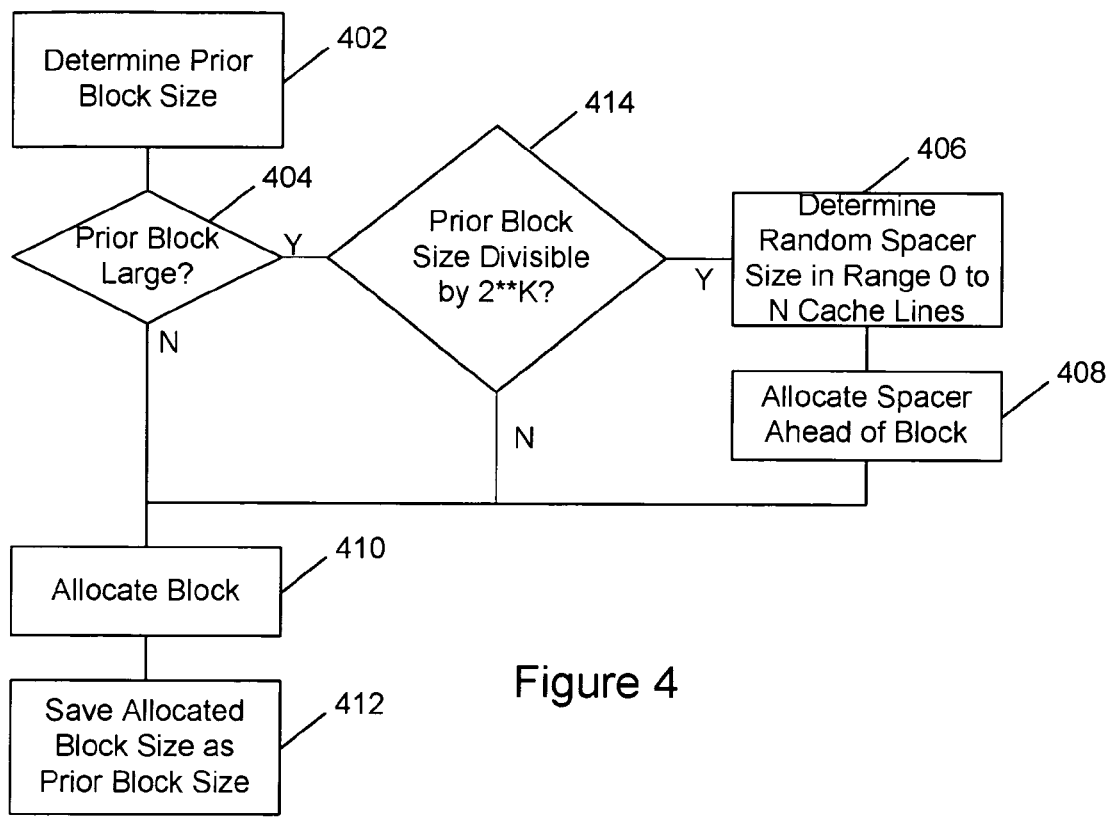
FIG. 4 is an exemplary flowchart of a method of allocating blocks in memory such that cache thrashing is minimized.

A new cache allocation scheme is illustrated in FIG. 4 with reference to FIG. 3. This scheme operates, upon a program or an operating system utility requesting allocation of a new block, by determining 402 the size of the most recently allocated memory block 304. If 404 this most recently allocated memory block 304 size is large, that is it exceeds a threshold T size, a spacer size is determined 406. In a particular embodiment, spacer size is determined 406 by generating a random number R in the range of zero to N, where N is a predetermined, adjustable, maximum number of cache lines. The random number R is multiplied by the cache line size to generate the spacer size, the spacer size is therefore determined randomly within a predetermined range of allowed spacer sizes. A spacer block 306 is then allocated 408 of the determined spacer block size. The requested memory block 308 is then allocated 410 adjacent to the spacer block 306. The result is a pattern of large spacers 306, and smaller spacers 310, interspersed among large blocks of allocated memory 304, 308, 312. Threshold T size is an adjustable constant that may be tuned by a system administrator to optimize performance on a particular software configuration and cache 502 architecture of the system 500. Similarly, maximum spacer size N is an adjustable constant that may be tuned by a system administrator to optimize performance on a particular software configuration and cache 502 architecture of the system 500.

In an alternative embodiment, the spacer size is a fixed, predetermined, size.

When large blocks are allocated successively, the cache allocation scheme of FIG. 4 results in insertion of a spacer to help prevent hot spots in multiple blocks from mapping into the same cache sets. When large blocks are allocated with one or more small blocks between them, it has been found that the small blocks tend to act as spacers such that insertion of additional spacers is often not necessary In an alternative embodiment, insertion of the spacer is performed only if 414 the prior block size is an even multiple of a predetermined power of two. In this alternative embodiment, the spacer is inserted if the requested block size is equal to S times 2 to the power K, where S is variable and K is an adjustable constant that is tuned to the cache 502 architecture of system 500.

For example, a system having a 24 megabyte cache organized in cache lines of 128 bytes in 24 ways has 8192 sets. For this cache, threshold T size can be set to 8192 bytes, the maximum spacer size N to 16 cache lines, and K, the power of two, set to 13.

In an alternative embodiment, the spacers are inserted at the end of large memory blocks as these blocks are allocated.

In an alternative embodiment, the spacers are of random size and are inserted ahead of memory blocks whenever the preceding memory block is a large memory block. In another embodiment, the spacers are of size determined from a blocks allocated count. In another alternative embodiment, the spacers are located within allocated memory blocks and are implemented by avoiding use of a randomized number of cache lines of memory at the head end of the block.

In an alternative embodiment, garbage collection of spacers is inhibited until the following memory block is released.

Where spacer blocks are allocated as separate blocks, appropriate links are maintained such that the spacer blocks are released upon release of the associated block in order to avoid memory leakage.

A computer program product is any machine-readable media, such as an EPROM, ROM, RAM, DRAM, disk memory, or tape, having recorded on it computer readable code that, when read by and executed on a computer, instructs that computer to perform a particular function or sequence of functions. The computer readable code of a program product may be part or all of a program, such as an operating system or application program module for allocating memory. A computer system, such as illustrated in FIG. 5, having memory, the memory containing a dynamic memory allocation module is a computer program product.

While the forgoing has been particularly shown and described with reference to particular embodiments thereof, it will be understood by those skilled in the art that various other changes in the form and details may be made without departing from the spirit and hereof. It is to be understood that various changes may be made in adapting the description to different embodiments without departing from the broader concepts disclosed herein and comprehended by the claims that follow.

What is claimed is:

1. A method of dynamically allocating memory of a computer system operable when a program running on the computer system requests allocation of a requested memory block from a memory pool comprising steps of:
    testing a size of the requested memory block to determine if the size is representable as N times two raised to the power M times a cache line size of the computer system, where N is an integer equal to or greater than 1, and M is an integer greater than one; and, if the size of the requested memory block is so representable, further comprising:
        determining a spacer size determined as a random spacer size within a predetermined range of allowable spacer size,
        reserving a spacer block of memory from the memory pool, the spacer block being of the spacer size; and
        allocating the memory block, adjacent to the spacer block, from the memory pool.

2. The method of claim 1, wherein the integer M is parameterized such that it may be adjusted to optimize performance.

3. The method of claim 2 wherein the range of permissible spacer sizes is adjustable by a system administrator.

* * * * *